(12) United States Patent
Fukahori et al.

(10) Patent No.: US 11,933,088 B2
(45) Date of Patent: Mar. 19, 2024

(54) SLIDING DOOR STRUCTURE

(71) Applicant: HONDA MOTOR CO., LTD., Tokyo (JP)

(72) Inventors: Takashi Fukahori, Tokyo (JP); Yuichiro Saiki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 17/669,531

(22) Filed: Feb. 11, 2022

(65) Prior Publication Data
US 2022/0290474 A1  Sep. 15, 2022

(30) Foreign Application Priority Data

Mar. 12, 2021 (JP) .................................. 2021-040194

(51) Int. Cl.
*E05D 15/10* (2006.01)
*B60J 5/04* (2006.01)
(Continued)

(52) U.S. Cl.
CPC ............. *E05B 83/40* (2013.01); *B60J 5/0479* (2013.01); *E05B 79/20* (2013.01); *E05B 85/243* (2013.01); *E05D 15/101* (2013.01); *E05D 15/30* (2013.01); *E05B 83/38* (2013.01); *E05D 2015/1026* (2013.01); *E05D 2015/1031* (2013.01); *E05Y 2201/624* (2013.01); *E05Y 2201/684* (2013.01); *E05Y 2201/692* (2013.01); *E05Y 2900/531* (2013.01)

(58) Field of Classification Search
CPC .......... E05B 83/40; E05B 83/38; E05B 79/20; E05B 85/243; B60J 5/0479; B60J 5/06; E05D 15/101; E05D 15/30; E05D 15/0604; E05D 15/0652; E05D 2015/106; E05D 2015/1031; E05D 2015/1034; E05D 2015/034; E05Y 2201/624; E05Y 2201/684; E05Y 2201/692; E05Y 2201/22; E05Y 2900/531; E05C 17/60
USPC ............................................................ 49/360
See application file for complete search history.

(56) References Cited

U.S. PATENT DOCUMENTS

| | | | |
|---|---|---|---|
| 7,422,268 B2 * | 9/2008 | Kothe ..................... | E05B 83/40 49/360 |
| 8,282,156 B1 * | 10/2012 | Thiele ..................... | E05F 5/003 296/207 |

(Continued)

FOREIGN PATENT DOCUMENTS

| | | | | |
|---|---|---|---|---|
| CN | 115613912 A | * | 1/2023 | ............ E05F 15/635 |
| DE | 202016103804 U1 | * | 11/2017 | |

(Continued)

OTHER PUBLICATIONS

Japanese Office Action corresponding to JP 2021-040194, dated Dec. 13, 2022, 13 pages.

*Primary Examiner* — Jerry E Redman
(74) *Attorney, Agent, or Firm* — Rankin, Hill & Clark LLP (57) ABSTRACT

A latch member for full opening includes a latch member for full opening that operates a latch claw into an engagement position or a non-engagement position with a striker. The latch member for full opening is configured of a first member on a sliding door side of a turning shaft, and is configured of a second member operated by the first member on a vehicle body side of the turning shaft.

3 Claims, 10 Drawing Sheets

(51) Int. Cl.
  *E05B 79/20* (2014.01)
  *E05B 83/40* (2014.01)
  *E05B 85/24* (2014.01)
  *E05D 15/30* (2006.01)
  *E05B 83/38* (2014.01)

(56) References Cited

U.S. PATENT DOCUMENTS

| | | | |
|---|---|---|---|
| 2007/0096504 A1 | 5/2007 | Kothe et al. | |
| 2010/0018125 A1* | 1/2010 | Oh | E05F 15/40 |
| | | | 49/449 |
| 2016/0010364 A1* | 1/2016 | Hanaki | E05B 83/40 |
| | | | 292/201 |
| 2016/0273262 A1* | 9/2016 | Maruyama | E05B 79/10 |
| 2016/0312500 A1* | 10/2016 | Hiramoto | E05B 81/16 |
| 2017/0174054 A1* | 6/2017 | Okuma | E05D 15/1047 |
| 2021/0115711 A1* | 4/2021 | Min | E05B 83/40 |
| 2021/0140216 A1* | 5/2021 | Choi | E05D 15/1042 |
| 2021/0172236 A1* | 6/2021 | Choi | E05D 15/48 |
| 2021/0172237 A1* | 6/2021 | Choi | E05F 15/655 |
| 2021/0262272 A1* | 8/2021 | Bessel | B60J 5/0477 |
| 2022/0090421 A1* | 3/2022 | Choi | B60J 5/047 |
| 2022/0090427 A1* | 3/2022 | Choi | E05D 15/48 |
| 2022/0106822 A1* | 4/2022 | Yun | B60J 5/047 |
| 2022/0289005 A1* | 9/2022 | Saiki | B60J 5/0477 |
| 2022/0290474 A1* | 9/2022 | Fukahori | E05D 15/30 |
| 2022/0349223 A1* | 11/2022 | Roeder | E05B 83/40 |

FOREIGN PATENT DOCUMENTS

| | | | | |
|---|---|---|---|---|
| EP | 791709 | A2 * | 8/1997 | B60K 6/36 |
| EP | 3633127 | A1 * | 4/2020 | E05D 15/10 |
| JP | 63-143665 | U | 9/1998 | |
| JP | H10-317766 | A | 12/1998 | |
| JP | H11-107606 | A | 4/1999 | |
| JP | 2004-175199 | | 6/2004 | |
| JP | 2009-102862 | | 5/2009 | |
| JP | 2018155041 | A * | 10/2018 | B60J 5/047 |
| KR | 101795550 | B1 * | 11/2017 | |

\* cited by examiner

FIG.1

FRONT ⟷ REAR

SLIDING DOOR STRUCTURE

INCORPORATION BY REFERENCE

The present application claims priority under 35 U.S.C. § 119 to Japanese Patent Application No. 2021-040194 filed on Mar. 12, 2021. The content of the applications is incorporated herein by reference in its entirety.

BACKGROUND OF THE INVENTION

Field of the Invention

The present invention relates to a sliding door structure.

Description of the Related Art

Some vehicles use sliding doors that open and close by sliding.

For such a sliding door structure, there is conventionally disclosed a technique in which a mechanism for unlocking the sliding door is such that a cable that operates a lock lever is laid under a lower arm through a slit (see, for example, Japanese Patent Laid-Open No. 2009-102862).

Furthermore, there is disclosed a sliding door structure in which a lower arm is rotatable with respect to the sliding door when the sliding door opens and closes (see, for example, Japanese Patent Laid-Open No. 2004-175199).

In the conventional technique, the lower rail may not be placed on the vehicle inner side due to reasons such as loading a battery under the floor.

In that case, as in Japanese Patent Laid-Open No. 2004-175199, a sliding door structure in which the lower arm itself turns may be used.

However, if a structure for passing a cable under the lower arm as in Japanese Patent Laid-Open No. 2009-102862 is used in such a structure, the cable may be swung around as the sliding door opens and closes. Furthermore, the width between the vehicle body and the door changes as the sliding door opens and closes, so that the extra length of the cable hangs down when the door closes. This may damage the cable and hinder the smooth movement of the door opening and closing.

The present invention has been made in view of the above points, and it is an object of the present invention to provide a sliding door structure capable of smoothly opening and closing a sliding door and capable of preventing damage to a cable even in the sliding door with a lower arm itself turning.

SUMMARY OF THE INVENTION

In order to achieve the above object, an aspect of the present invention is a sliding door structure, including: a sliding door for opening and closing a door opening provided in a vehicle body; a lower rail extending along a lower edge of the door opening; a lower arm that connects the sliding door and the lower rail and is turnable around a turning shaft; a guide roller that is supported by the lower arm and is movable along the lower rail; a striker fixed to the lower rail; and a latch member for full opening, attached to the lower arm, for engaging a latch portion with a striker at a fully open position of the sliding door to hold the sliding door at the fully open position, wherein the latch member for full opening operates the latch portion into an engagement position or a non-engagement position with the striker, and the latch member for full opening is configured of a first member on the sliding door side of the turning shaft, and a second member operated by the first member on the vehicle body side of the turning shaft.

In the above configuration, the second member is configured of a link mechanism.

In the above configuration, the link mechanism includes a rod that has one end connecting to the latch portion and is provided along the lower arm in the sliding door direction, and a rotating body that is connected to another end of the rod and is rotatable around the turning shaft.

In the above configuration, the rotating body includes a pushing piece on the side opposite to the rod across the rotation center, the first member has a cable and a cable operating member that moves according to an operation of the cable, and the pushing piece and the cable operating member are placed at positions close to each other at a fully open position of the sliding door.

According to an aspect of the present invention, the latch member for full opening is configured of the first member on the sliding door side of the turning shaft of the lower arm and the second member on the vehicle body side thereof. This can prevent the first member and the second member from twisting around the rotating shaft to prevent the first member and the second member from damage when the lower arm turns as the door opens and closes. Therefore, the front door and rear door can open and close smoothly.

DETAILED DESCRIPTION OF THE PREFERRED EMBODIMENTS

Embodiments

The following describes embodiments of the present invention with reference to the drawings. In the description, left and right refer to left and right based on the occupant of a vehicle, and front and rear refer to front and rear based on the traveling direction of the vehicle.

Figure 1:
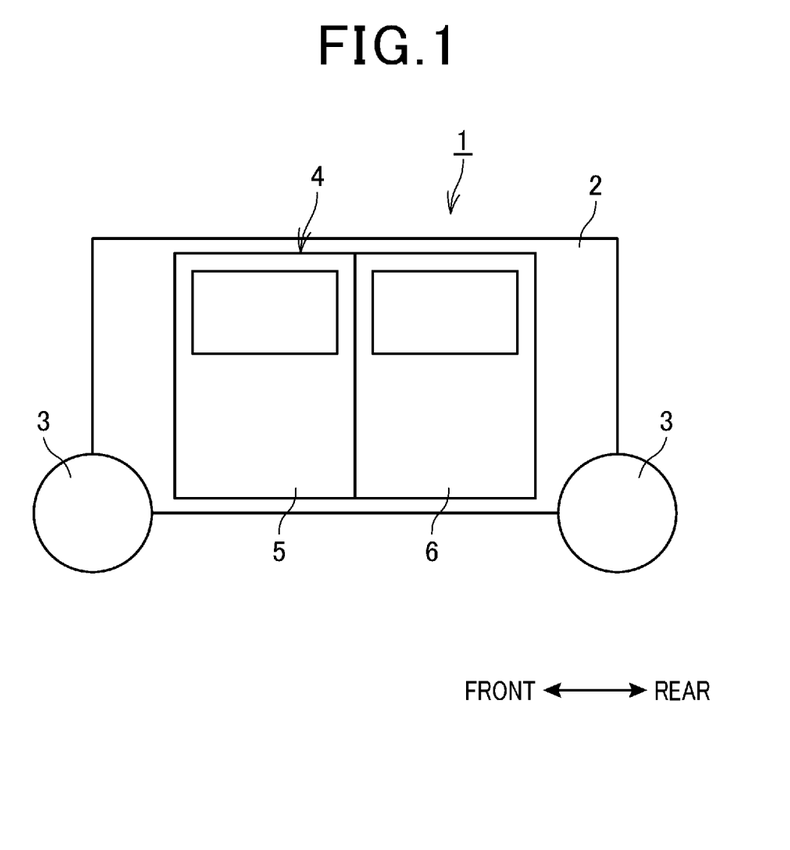
FIG. 1 is a front view of a vehicle to which a sliding door structure of the present invention is applied.

FIG. 1 is a schematic side view showing an embodiment of a vehicle to which a sliding door structure of the present invention is applied.

As shown in FIG. 1, a vehicle 1 includes tires 3 in front and rear of a vehicle body 2. Both sides of the vehicle body 2 are provided with sliding doors 4.

The sliding doors 4 include a front door 5 and a rear door 6. The front door 5 slides to open toward the front of the vehicle body 2 from the fully closed state. The rear door 6 slides to open toward the rear of the vehicle body 2 from the fully closed state.

In addition, the vehicle body 2 has a what is called pillarless structure having no center pillar. When the front door 5 and the rear door 6 are closed, the front door 5 is fixed to the lower part of the vehicle body 2 via a latch mechanism, and the rear door 6 is locked to the front door 5 to be fixed.

The following describes the sliding door structure in this embodiment.

Figure 2:
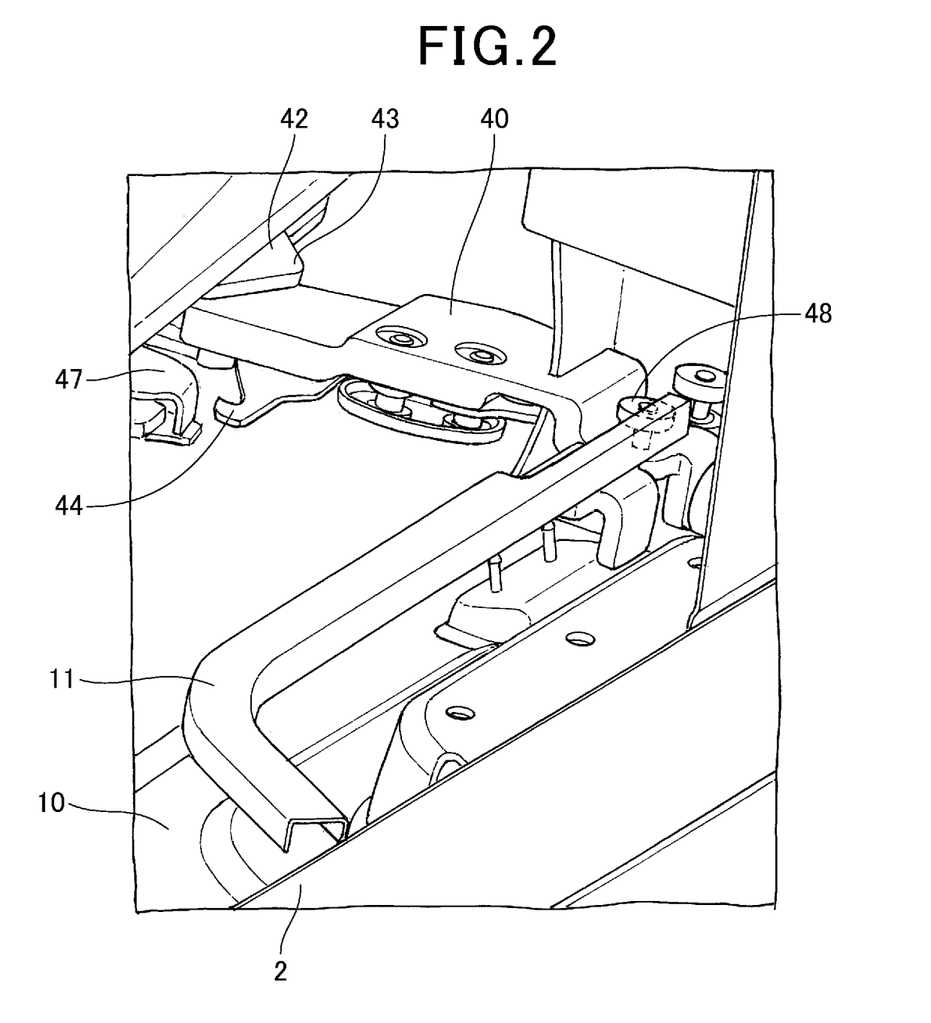
FIG. 2 is a perspective view of a lower arm portion in this embodiment.
Figure 3:
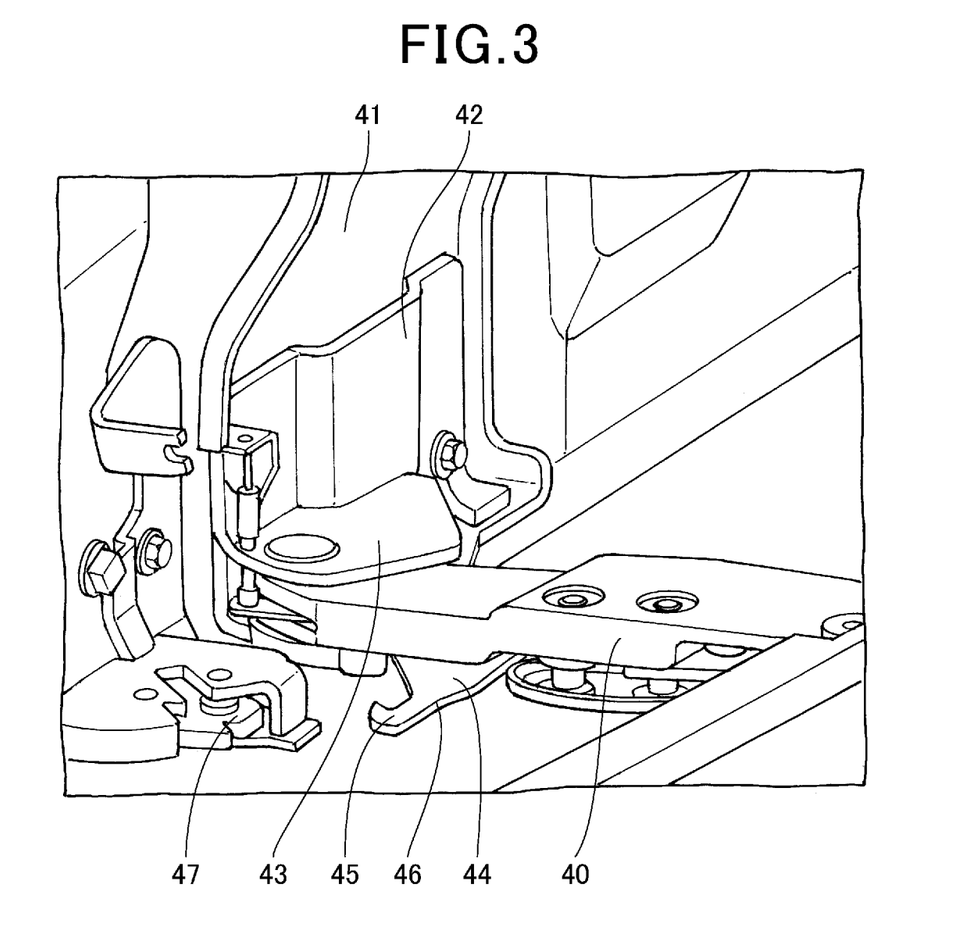
FIG. 3 is a perspective view of a lower arm portion in this embodiment.
Figure 4:
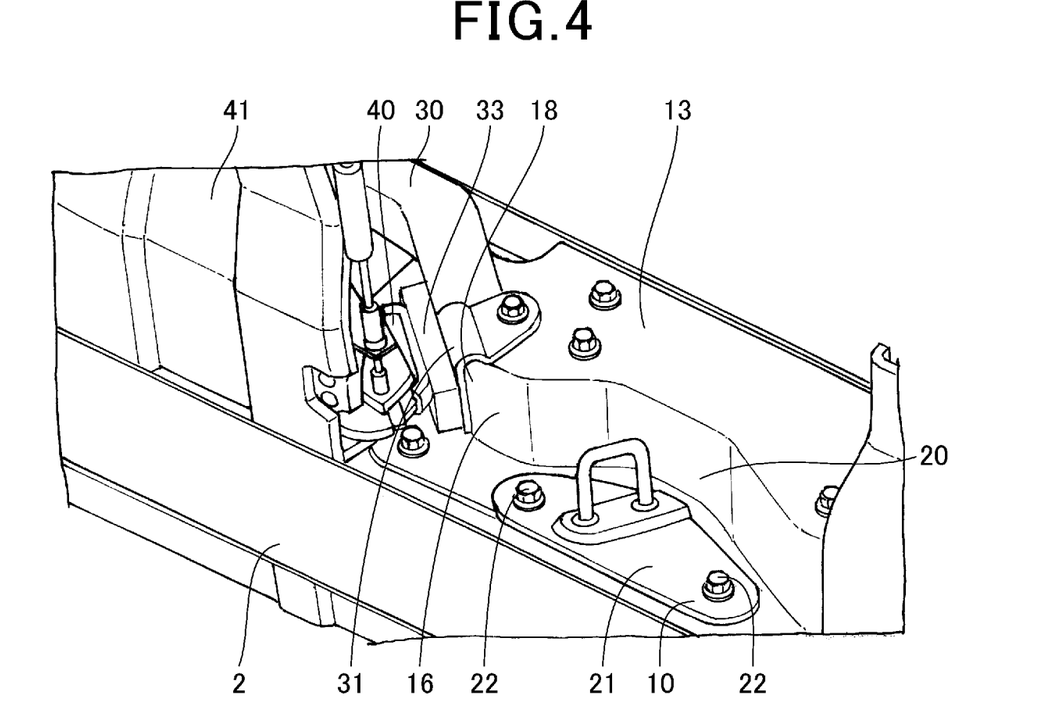
FIG. 4 is a perspective view of a reinforcing bracket portion in this embodiment.
Figure 5:
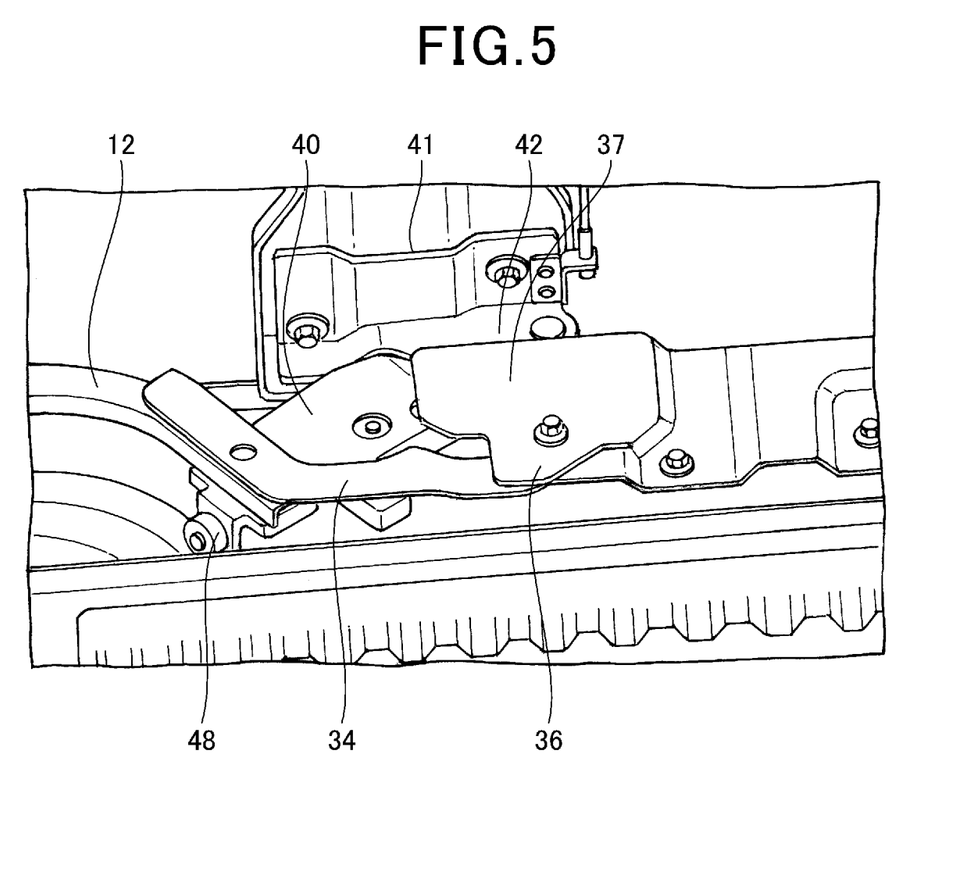
FIG. 5 is a perspective view of the reinforcing bracket portion in this embodiment as viewed from the inside of a vehicle.
Figure 6:
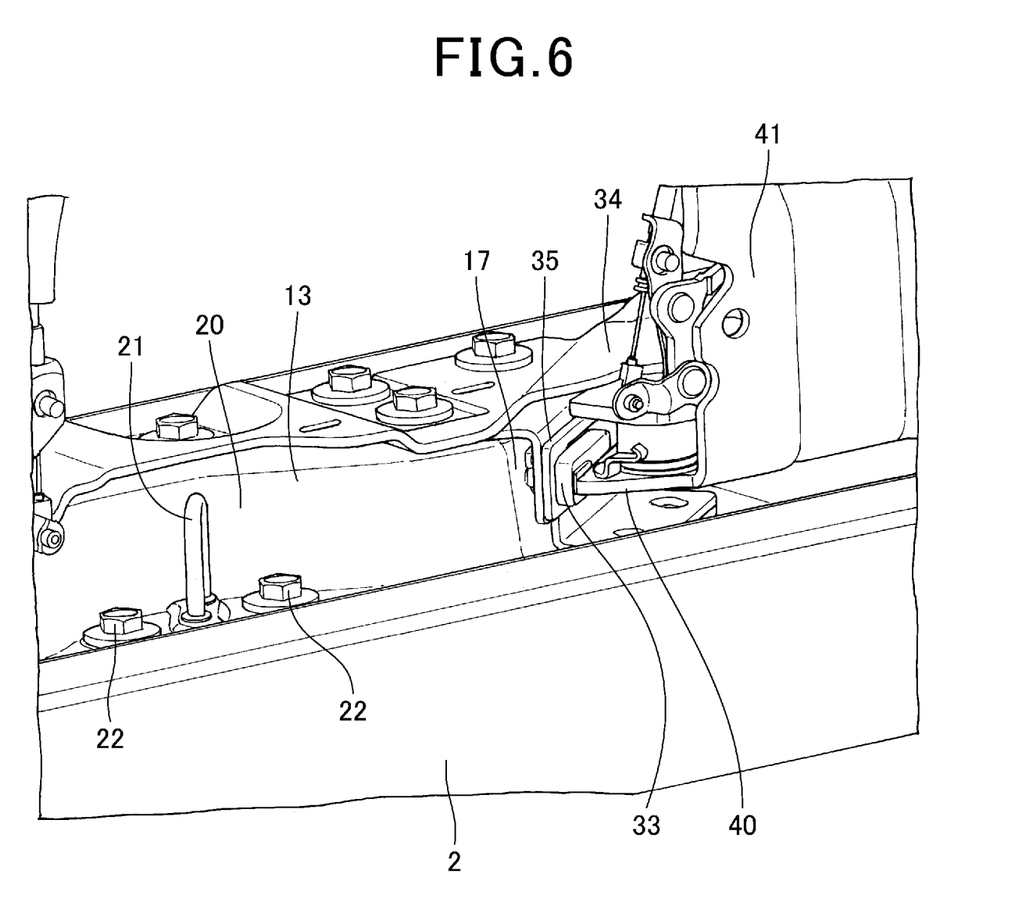
FIG. 6 is a perspective view of the reinforcing bracket portion in this embodiment.
Figure 7:
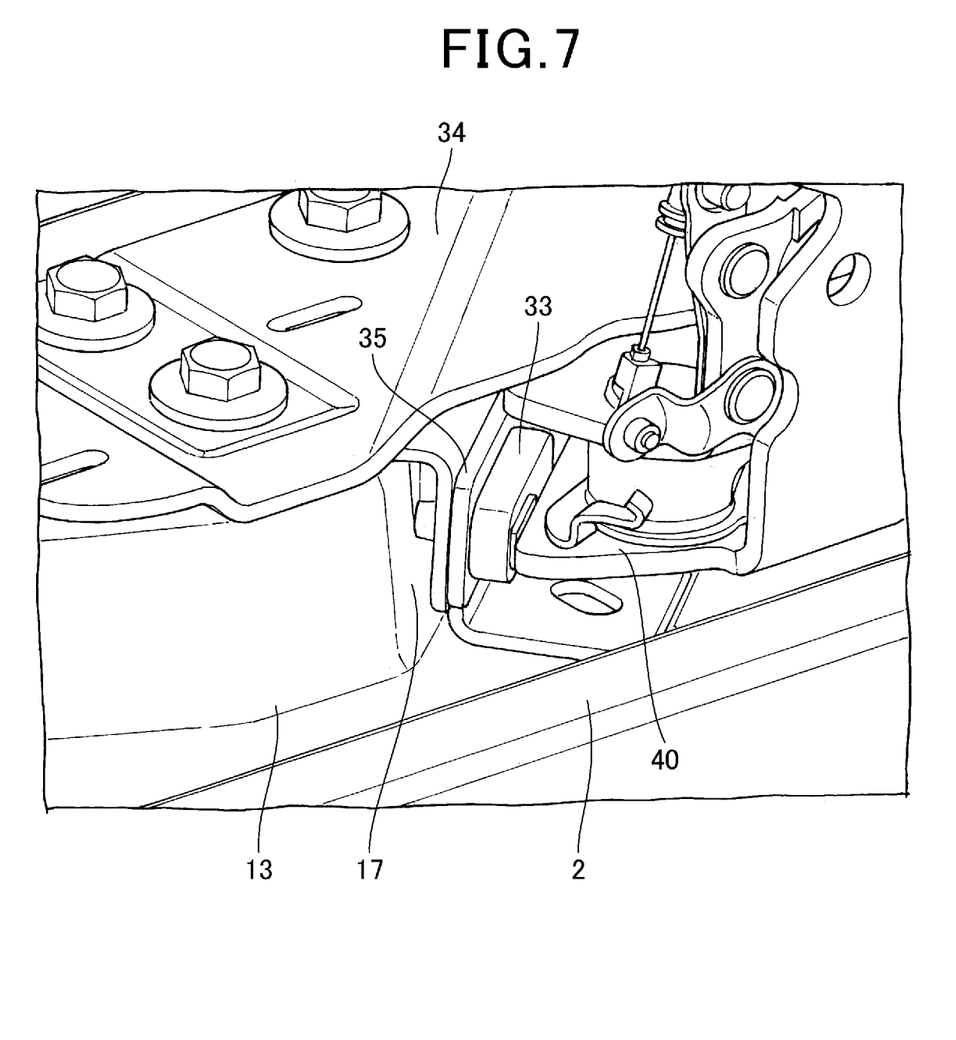
FIG. 7 is a perspective view showing a state in which an engagement projection engages with a rear engagement hole of the reinforcing bracket in this embodiment.
Figure 8:
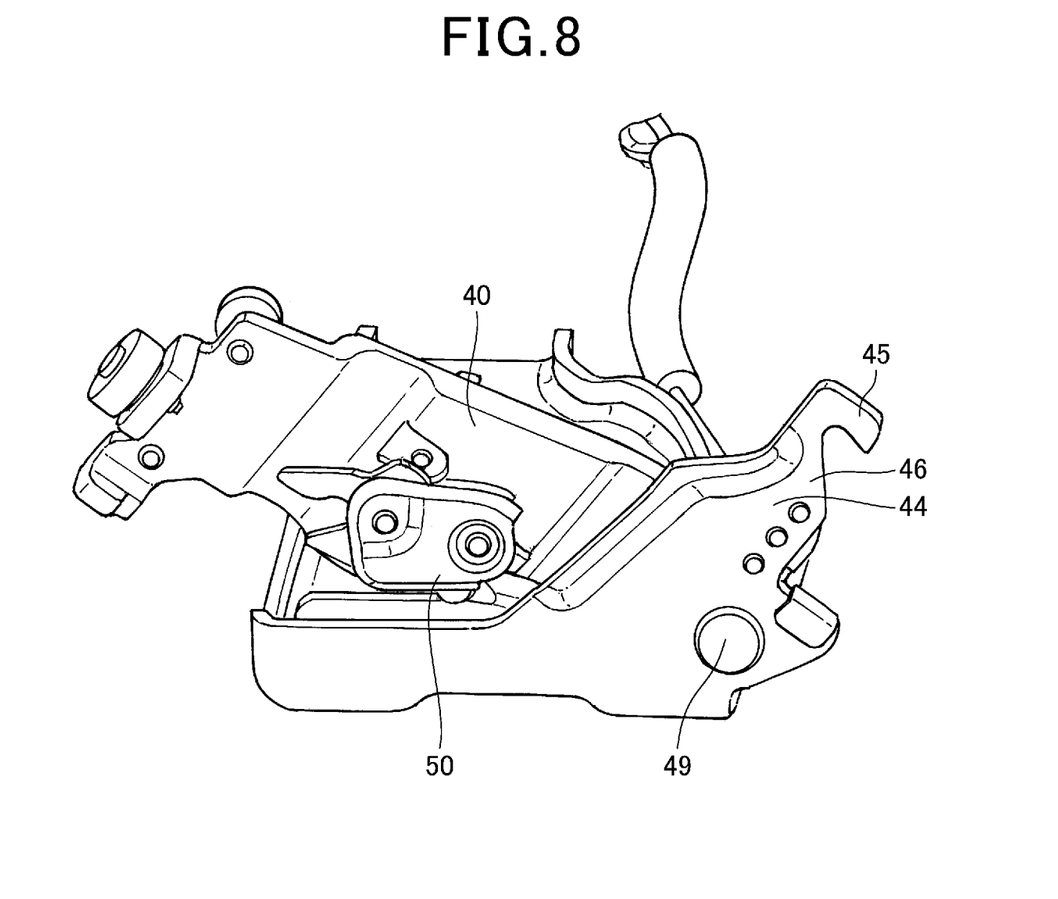
FIG. 8 is a perspective view of the lower arm in this embodiment as viewed from below.

FIG. 2 is a perspective view of a lower arm portion of the sliding door structure in this embodiment. FIG. 3 is a perspective view of the lower arm portion of the sliding door structure according to this embodiment. FIG. 4 is a perspective view of a reinforcing bracket portion of the sliding door structure according to this embodiment. FIG. 5 is a perspective view of the reinforcing bracket portion of the sliding door structure in this embodiment as viewed from the inside of the vehicle. FIG. 6 is a perspective view of the reinforcing bracket portion of the sliding door structure according to this embodiment. FIG. 7 is a perspective view showing a state in which an engagement projection engages with a rear engagement hole of the reinforcing bracket of the sliding door structure according to this embodiment. FIG. 8 is a perspective view of the lower arm in this embodiment as viewed from below.

As shown in FIGS. 2 to 8, the lower end of the opening of the vehicle body 2 is provided with a side sill 10 extending in the front-rear direction of the vehicle body 2. The upper surface side of the side sill 10 is provided with a front lower rail 11 and a rear lower rail 12 so as to be along the side sill 10.

A part between the rear end part of the front lower rail 11 and the front end part of the rear lower rail 12 is provided with a reinforcing bracket 13.

The reinforcing bracket 13 is formed in a box shape with a hollow inside, and the reinforcing bracket 13 includes a vertical wall portion 14 erected in the up-down direction around the reinforcing bracket 13. The lower end edge of the reinforcing bracket 13 is integrally formed with a flange portion 15 extending to the outside of the vehicle body 2.

Furthermore, the reinforcing bracket 13 includes a front support surface 16 and a rear support surface 17, which are inclined with respect to the front-rear direction of the vehicle body 2, at both ends in the front-rear direction. The front support surface 16 and the rear support surface 17 are formed so that the direction orthogonal to the front support surface 16 and the direction orthogonal to the rear support surface 17 intersect each other inside the vehicle body 2.

The front support surface 16 and the rear support surface 17 are formed with a front engagement hole 18 and a rear engagement hole 19, each of which is a substantially square engaged portion.

The reinforcing bracket 13 includes a recess portion 20 formed so that the vertical wall portion 14 on the outside of the vehicle body 2 in the substantially the central part in the front-rear direction is dented toward the inside of the vehicle.

At a position corresponding to the recess portion 20 of the reinforcing bracket 13, the side sill 10 is provided with a striker 21 for locking the latch mechanism of the front door 5, which is to be described below. The flange portion 15 of the reinforcing bracket 13 and the striker 21 are jointly fastened and fixed to the side sill 10 via bolts 22.

As shown in FIG. 4, the front lower rail 11 and the upper surface of the reinforcing bracket 13 are connected via a front lower rail bracket 30.

The front lower rail bracket 30 is integrally formed with a support plate 31 that is bent downward along the front support surface 16. At a position corresponding to the front engagement hole 18 of the reinforcing bracket 13, the support plate 31 is formed with a front hole portion (not shown) having substantially the same shape as the front engagement hole 18.

The periphery of the front hole portion is provided with a cushioning member 33 made of, for example, a resin material.

Similarly, as shown in FIG. 5, the rear lower rail 12 and the upper surface of the reinforcing bracket 13 are connected via a rear lower rail bracket 34. As shown in FIG. 5, the rear lower rail bracket 34 is integrally formed with a support plate 35 that is bent downward along the rear support surface 17. At a position corresponding to the rear engagement hole 19 of the reinforcing bracket 13, the support plate 35 is formed with a rear hole portion (not shown) having substantially the same shape as the rear engagement hole 19.

The periphery of the rear hole portion is provided with a cushioning member 33 made of, for example, a resin material.

As shown in FIG. 5, the upper surface of the reinforcing bracket 13 has a reinforcing member 36 attached thereon. On the indoor side of the vehicle body 2, the reinforcing member 36 is formed with a stepped portion 37 projecting upward.

A space is formed between the lower surface side of the stepped portion 37 and the upper surface of the reinforcing bracket 13. This space is a support space into which the support piece 43 of the female member 42, which is to be described below, is inserted.

The following describes the configuration of the sliding door.

As shown in FIGS. 2 and 3, at the lower part of the front door 5, there is attached a lower arm 40 protruding to the indoor side of the vehicle body 2.

The lower part of the front door 5 has a sliding door bracket 41 attached thereon, and the sliding door bracket 41 has a female member 42 attached thereon. The female member 42 is formed in a substantially L shape so that its lower end part extends to inside of the vehicle. The extending part of the female member 42 is a support piece 43, which is a support portion to be inserted into the space formed in the stepped portion 37 of the reinforcing member 36.

The lower arm 40 is turnably attached to the lower end part of the female member 42.

At the end part of the lower arm 40, there is rotatably attached a lower roller 48 that engages with the front lower rail 11 and is guided along the front lower rail 11.

The middle of the lower arm 40 is provided with an engagement projection 44 as an engaging portion that protrudes diagonally from one side and engages with the front engagement hole 18.

The engagement projection 44 includes a projection portion 45 that is inserted into and engages with the front engagement hole 18, and a base portion 46 that extends to both sides in the base end part of the projection portion 45.

In the vicinity of the base end part of the lower arm 40, there is attached a latch member for full closing 47 that engages with the striker 21 and holds the front door 5 in the closed state when the front door 5 fully closes.

On the lower surface of the front lower rail 11, there is attached a latch member for full opening 50 that holds the front door 5 in the open state when the front door 5 fully opens.

Furthermore, as shown in FIG. 7, the rear door 6 also has a lower arm 40 attached thereto, and the lower arm 40 is provided with an engagement projection 44, which is an engaging portion that engages with the rear engagement hole 19 of the reinforcing bracket 13.

The following describes the latch member for full opening 50.

The latch member for full opening 50 has an identical structure in the front door 5 and the rear door 6.

Figure 9:
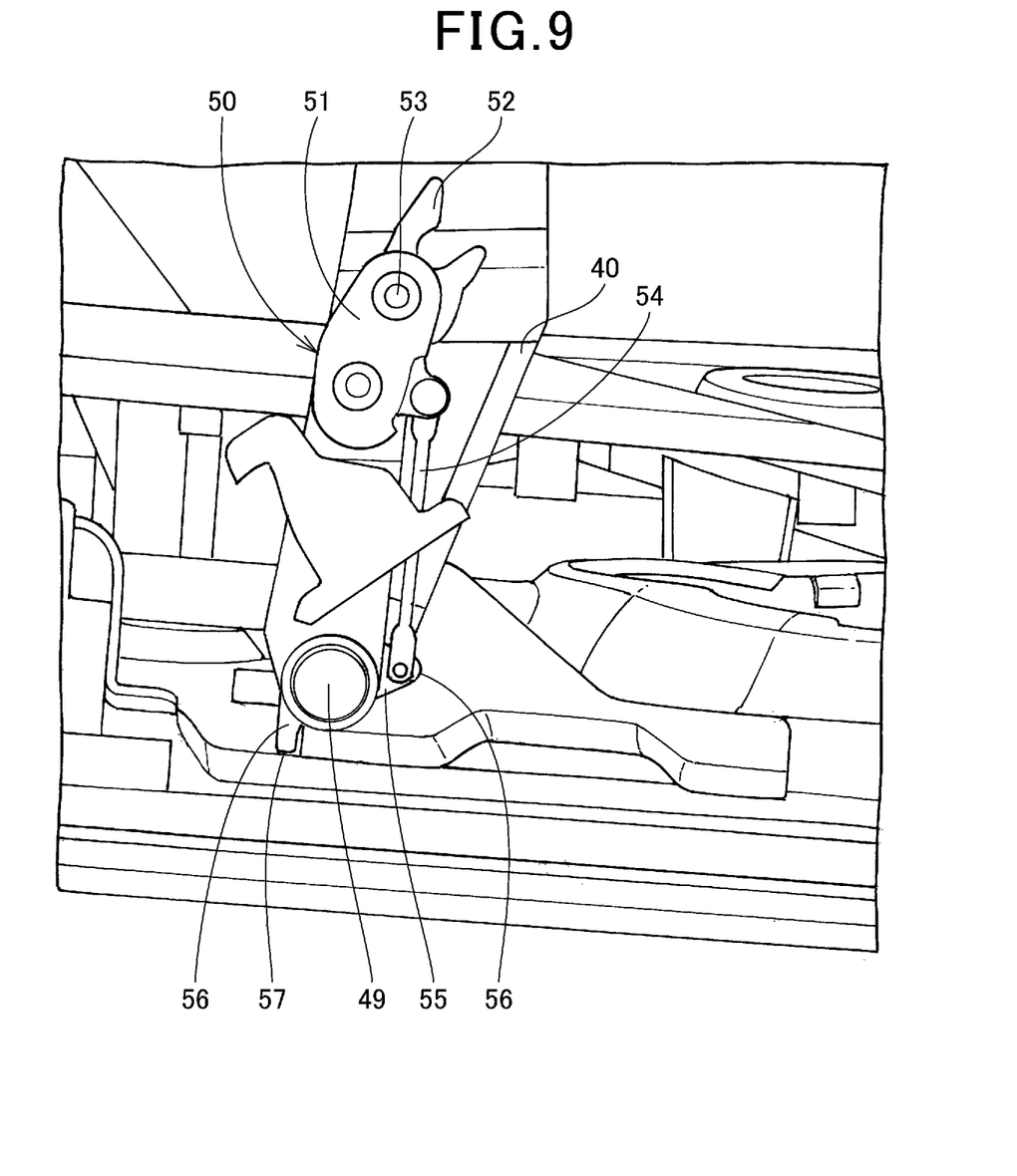
FIG. 9 is a perspective view of the lower arm portion in this embodiment as viewed from below.
Figure 10:
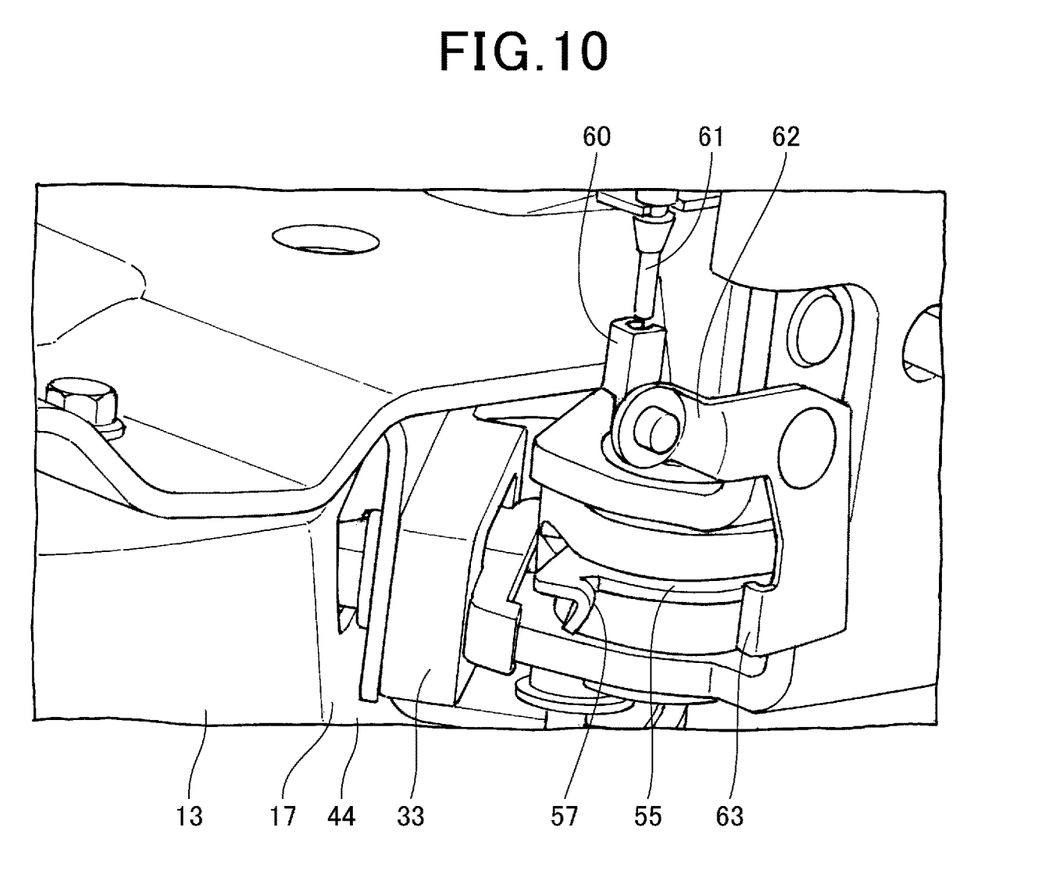
FIG. 10 is a perspective view of a rotating body portion in this embodiment.

FIG. 9 is a perspective view of the lower arm 40 portion as viewed from below. FIG. 10 is a perspective view of the rotating body portion.

As shown in FIG. 9, the latch member for full opening 50 includes a turning member 51 that is turnably attached to the lower arm 40 via a turning shaft 53. The end part of the turning member 51 is provided with a latch claw 52, which is a latch portion that engages with a striker for full opening (not shown) when the front door 5 fully opens.

One side part of the turning member 51, which is on the side opposite to the latch claw 52 with respect to the turning shaft 53, is provided with one end of a rod 54 provided along the lower arm 40.

In addition, the part of the female member to which the lower arm 40 is attached is provided with a rotating body 55. The rotating body 55 is coaxially attached to a turning shaft 49 that turnably supports the lower arm 40.

The outer peripheral part of the rotating body 55 is provided with two protruding members 56 protruding in the substantially radial direction. One of the protruding members 56 connects to the other end of the rod 54.

Then, in FIG. 9, when the rotating body 55 is rotated clockwise, the turning member 51 is turned clockwise via the rod 54, so that the latch claw 52 is turned clockwise. Thus turning the latch claw 52 in the clockwise direction releases the engagement between the striker for full opening and the latch claw 52.

An end part of the other of the protruding members 56 is formed with a pushing piece 57. The end of the pushing piece 57 is bent on a substantially horizontal axis to form an arc.

The above-mentioned turning member 51, a rod 54, and a rotating body 55 configure a link mechanism for a second member according to the present invention.

As shown in FIGS. 7 and 10, a cable support member 60 is provided in the vicinity of the upper side of the turning shaft 49. The cable support member 60 connects to one end of the cable 61. The other end of the cable 61 connects to a door handle (not shown) so that the cable 61 is pulled by operation of the door handle.

One end of the cable operating member 62 is attached to the cable support member 60. The cable operating member 62 is formed in a substantially L shape, and the cable operating member 62 is attached to the lower arm 40 so as to be turnable around the corner of the L shape.

The other end of the cable operating member 62 is provided with a cylindrical pushing portion 63 extending in the axial direction of the turning shaft 49.

The above-described cable 61, the cable support member 60, and the cable operating member 62 configure a first member according to the present invention.

FIG. 10 shows a state in which the rear door 6 fully closes, and in this state, the pushing piece 57 of the rotating body 55 and the pushing portion 63 of the cable operating member 62 are separated from each other. When the rear door 6 fully opens, the lower arm 40 turns around the rotating shaft as the rear door 6 opens, so that the pushing piece 57 of the rotating body 55 and the pushing portion 63 of the cable operating member 62 are placed in close proximity.

The following describes the operation of this embodiment with the above configuration.

In this embodiment, when the front door 5 closes, the front door 5 moves in the closing direction while the lower roller 48 of the front door 5 is guided by the front lower rail 11.

Then, while the front door 5 is guided by the front lower rail 11, the rear end part of the front door 5 moves to the vehicle body 2 side, and the front door 5 closes.

With the front door 5 completely closed, the engagement projection 44 provided on the lower arm 40 is inserted into the front engagement hole 18 of the reinforcing bracket 13.

Similarly, the rear door 6 also moves while the lower roller 48 of the lower arm 40 is guided by the rear lower rail 12. With the rear door 6 completely closed, the engagement projection 44 provided on the lower arm 40 is inserted into the rear engagement hole 19 of the reinforcing bracket 13.

In addition, when the front door 5 or the rear door 6 opens to the fully open state, the latch claw 52 of the latch member for full opening 50 engages with the striker for full opening to hold the front door 5 or the rear door 6 in the fully open state.

In closing the front door 5 or the rear door 6, the door handle is operated so that the cable 61 is pulled. This turns the cable operating member 62 clockwise in FIG. 10 via the cable support member 60.

The turning operation of the cable operating member 62 causes the pushing portion 63 to push the pushing piece 57 of the rotating body 55 to turn the rotating body 55 clockwise.

The pushing portion 63 is formed in a cylindrical shape extending in the axial direction of the rotating shaft, and the pushing piece 57 is formed in an arc shape on a substantially horizontal axis. Then, the pushing portion 63 and the pushing piece 57 come into contact with each other on curved surfaces. This can reduce the contact resistance to prevent damage to the pushing portion 63 or the pushing piece 57.

Furthermore, the curved surface of the pushing portion 63 and the curved surface of the pushing piece 57 come into contact with each other in a state of intersecting with each other at approximately 90°. This allows the force due to the turn of the cable operating member 62 to be reliably transmitted to the pushing piece 57.

Then, in FIG. 9, when the rotating body 55 is rotated clockwise, the turning member 51 is turned clockwise via the rod 54, so that the latch claw 52 is turned clockwise. Thus turning the latch claw 52 in the clockwise direction releases the engagement between the striker for full opening and the latch claw 52, and allows the closing operation.

As described above, in this embodiment, a latch member for full opening 50 includes a latch member for full opening that operates the latch claw 52 (latch portion) into an engagement position or a non-engagement position with the striker; and a latch member for full opening 50 is configured of a first member in a sliding door side of the turning shaft 49, and is configured of the second member operated by the first member on the vehicle body side of the turning shaft 49.

Thus, the latch member for full opening 50 is configured of the first member on the sliding door side of the turning shaft 49 of the lower arm 40 and the second member on the vehicle body side thereof. This can prevent the first member and the second member from twisting around the rotating shaft to prevent the first member and the second member from damage when the lower arm 40 turns as the door opens and closes. Therefore, the front door 5 and the rear door 6 can smoothly open and close.

In addition, in this embodiment, the second member is configured of a link mechanism.

Since the second member that operates the latch member for full opening 50 is a link mechanism, an extra length is not generated unlike the conventional cable 61 when the latch portion is operated into the engagement position or the non-engagement position with the striker. Therefore, the front door 5 and the rear door 6 can smoothly open and close.

In addition, in this embodiment, the link mechanism is configured of: the rod 54 that has one end connecting to a latch claw 52 (latch portion) and is provided along the lower arm 40 in the front door 5 and rear door 6 directions; and a rotating body 55 that connects to the other end of the rod 54 and is rotatable around the turning shaft 49.

This makes the center of turning shaft 49 of the lower arm 40 identical to the rotation center of the rotating body 55 of the link mechanism, so that the latch member for full opening can be operated accurately according to the movement of the lower arm 40. Furthermore, this can reduce the number of parts and can save the space around the lower arm 40.

Additionally, in this embodiment, the rotating body 55 includes a pushing piece 57 on the side opposite to the rod 54 across the rotation center thereof; the first member has a cable 61 and a cable operating member 62 that moves according to the operation of the cable; and the pushing piece 57 and the cable operating member 62 are placed at positions close to each other with the sliding door being at the fully open position.

Thus, the pushing piece 57 and the cable operating member 62 are placed close to each other at the fully open position, so that the operation of the cable 61 is not transmitted to the rotating body 55 except at the fully open positions of the front door 5 and the rear door 6. Therefore, the latch portion is not operated unnecessarily except at the fully open positions of the front door 5 and the rear door 6, and no operating noise or the like is generated.

Although the above describe the embodiments of the present invention, various design changes with the present invention can be made without departing from the gist thereof.

Although the embodiment illustrates the case in which the front door 5 and the rear door 6 are both sliding doors, the same can apply to, for example, a case in which only the front door 5 or the rear door 6 is a sliding door.

[Configurations Supported by the Above Embodiment]

The above embodiment supports the following configurations.

(Configuration 1)

A sliding door structure, including: a sliding door for opening and closing a door opening provided in a vehicle body; a lower rail extending along a lower edge of the door opening; a lower arm that connects the sliding door and the lower rail and is turnable around a turning shaft; a guide roller that is supported by the lower arm and is movable along the lower rail; a striker fixed to the lower rail; and a latch member for full opening, attached to the lower arm, for engaging a latch portion with a striker at a fully open position of the sliding door to hold the sliding door at the fully open position, wherein the latch member for full opening operates the latch portion into an engagement position or a non-engagement position with the striker, and the latch member for full opening is configured of a first member on the sliding door side of the turning shaft, and a second member operated by the first member on the vehicle body side of the turning shaft.

According to this configuration, the latch member for full opening is configured of the first member on the sliding door side of the lower arm turning shaft, and the second member on the vehicle body side thereof. This can prevent the first member and the second member from twisting around the rotating shaft to prevent the first member and the second member from damage when the lower arm turns as the door opens and closes.

(Configuration 2)

The sliding door structure according to configuration 1, wherein the second member is configured of a link mechanism.

According to this configuration, the second member that operates the latch member for full opening is the link mechanism, and an extra length is not generated unlike the conventional cable 61 when the latch portion is operated into the engagement position or the non-engagement position with the striker. Therefore, the front door and the rear door can smoothly open and close.

(Configuration 3)

The sliding door structure according to configuration 2, wherein the link mechanism includes a rod that has one end connecting to the latch portion and is provided along the lower arm in the sliding door direction, and a rotating body that is connected to another end of the rod and is rotatable around the turning shaft.

According to this configuration, the center of the turning shaft of the lower arm is the same as the rotation center of the rotating body of the link mechanism. This allows the latch member for full opening to be operated accurately according to the movement of the lower arm, and allows the number of parts to be reduced and the space around the lower arm to be saved.

(Configuration 4)

The sliding door structure according to configuration 3, wherein the rotating body includes a pushing piece on the side opposite to the rod across the rotation center, the first member has a cable and a cable operating member that moves according to an operation of the cable, and the pushing piece and the cable operating member are placed at positions close to each other at a fully open position of the sliding door.

According to this configuration, the pushing piece and cable operating member are placed close to each other at the fully open position of the front door and the rear door, so that the operation of the cable is not transmitted to the rotating body except at the fully open position. Therefore, the latch portion is not operated unnecessarily except at the fully open positions of the front door and the rear door, and no operating noise is generated.

REFERENCE SIGNS LIST 1 vehicle
2 vehicle body
3 tire
4 sliding door
5 front door
6 rear door
10 side sill 11 front lower rail
12 rear lower rail
13 reinforcing bracket
14 vertical wall portion
16 front support surface
17 rear support surface
18 front engagement hole
19 rear engagement hole
21 striker
30 front lower rail bracket
31 support plate
33 cushioning member
34 rear lower rail bracket
35 support plate
36 reinforcing member
40 lower arm
41 sliding door bracket
42 female member
47 latch member for full closing
48 lower roller
50 latch member for full opening
51 turning member
52 latch claw
53 turning shaft
54 rod
55 rotating body
56 protruding member
57 pushing piece
60 cable support member
61 cable
62 cable operating member
63 pushing portion

What is claimed is:

1. A sliding door structure, comprising:
a sliding door for opening and closing a door opening provided in a vehicle body;
a lower rail extending along a lower edge of the door opening;
a lower arm that connects the sliding door and the lower rail and is turnable around a turning shaft;
a guide roller that is supported by the lower arm and is movable along the lower rail;
a striker fixed to the lower rail; and
a latch member for full opening for engaging a latch portion with a striker at a fully open position of the sliding door to hold the sliding door at the fully open position, the latch portion being attached to the lower arm,
wherein the latch member for full opening operates the latch portion into an engagement position or a non-engagement position with the striker,
the latch member for full opening is configured of a first member on the sliding door side of the turning shaft, and a second member operated by the first member on the vehicle body side of the turning shaft,
the second member has a rotating body that is connected to the latch portion and is rotatable around the turning shaft,
the rotating body includes a pushing piece on the side opposite to a part connected to the latch portion across a rotation center of the rotating body,
the first member has a cable and a cable operating member that moves according to an operation of the cable, and
the pushing piece and the cable operating member are disposed such that at a fully closed position of the sliding door, the pushing piece of the rotating body and a pushing portion of the cable operating member are placed at positions separated from each other and that the pushing piece of the rotating body and the pushing portion of the cable operating member are placed at positions that approach each other as the sliding door moves from the fully closed position to the fully open position.

2. The sliding door structure according to claim 1, wherein the second member is configured of a link mechanism,
the link mechanism includes a rod that has one end connecting to the latch portion, that is provided along the lower arm in the sliding door direction and that has an other end connected to the rotating body.

3. The sliding door structure according to claim 1, wherein
the lower arm extends from the sliding door to the lower rail, connects the sliding door and the lower rail, has one end at the sliding door side and an other end at the lower rail side and is turnable against the sliding door around the turning shaft provided to the one end, and
the guide roller is supported by the other end of the lower arm and is movable along the lower rail.

* * * * *